(12) United States Patent
Tanaka et al.

(10) Patent No.: US 12,037,250 B2
(45) Date of Patent: Jul. 16, 2024

(54) MICROPARTICLE PRODUCTION METHOD AND MICROPARTICLE PRODUCTION APPARATUS

(71) Applicant: NISSHIN SEIFUN GROUP INC., Tokyo (JP)

(72) Inventors: Yasunori Tanaka, Ishikawa (JP); Naoto Kodama, Ishikawa (JP); Yousuke Ishisaka, Ishikawa (JP); Shu Watanabe, Saitama (JP); Keitaro Nakamura, Saitama (JP); Shiori Sueyasu, Saitama (JP)

(73) Assignee: NISSHIN SEIFUN GROUP INC., Tokyo (JP)

( * ) Notice: Subject to any disclaimer, the term of this patent is extended or adjusted under 35 U.S.C. 154(b) by 831 days.

(21) Appl. No.: 17/054,390

(22) PCT Filed: May 8, 2019

(86) PCT No.: PCT/JP2019/018403
§ 371 (c)(1),
(2) Date: Nov. 10, 2020

(87) PCT Pub. No.: WO2019/216343
PCT Pub. Date: Nov. 14, 2019

(65) Prior Publication Data
US 2021/0061665 A1   Mar. 4, 2021

(30) Foreign Application Priority Data

May 11, 2018   (JP) .................................. 2018-092402

(51) Int. Cl.
*C01B 33/03* (2006.01)
*B01J 19/08* (2006.01)
*H05H 1/30* (2006.01)

(52) U.S. Cl.
CPC ............. *C01B 33/03* (2013.01); *B01J 19/088* (2013.01); *H05H 1/30* (2013.01);
(Continued)

(58) Field of Classification Search
CPC . C01B 33/03; B01J 19/088; B01J 2219/0801; B01J 2219/0869;
(Continued)

(56) References Cited

U.S. PATENT DOCUMENTS

2008/0063589 A1*   3/2008   Nakayama .............. D01F 9/133
423/447.2
2016/0175936 A1    6/2016   Boulos

FOREIGN PATENT DOCUMENTS

CN       106457180 A     2/2017
JP       2005-177662 A   7/2005
(Continued)

*Primary Examiner* — Xiuyu Tai
(74) *Attorney, Agent, or Firm* — Muncy, Geissler, Olds & Lowe, P.C.

(57) ABSTRACT

Provided are a method and apparatus capable of producing fine particles with favorable particle size distribution. In a production method in which feedstock for fine particle production is supplied intermittently into a modulated induction thermal plasma flame, the feedstock is vaporized to form a gas phase mixture, and the mixture is cooled to produce the fine particles: a modulated induction thermal plasma flame in which the temperature state is time-modulated is generated; the modulated induction thermal plasma flame is switched between a high temperature state and a low temperature state; and when the modulated induction thermal plasma flame is in the high temperature state, the feedstock is supplied together with a carrier gas, and when the modulated induction thermal plasma flame is in the low temperature state, supply of the feedstock is suspended and a gas of the same type as the carrier gas is supplied.

12 Claims, 8 Drawing Sheets

(52) U.S. Cl.
CPC .............................. *B01J 2219/0801* (2013.01); *B01J 2219/0869* (2013.01); *B01J 2219/0898* (2013.01)

(58) Field of Classification Search
CPC ....... B01J 2219/0898; B01J 2/02; H05H 1/30; H05H 1/38; H05H 1/42; H05H 1/46; H05H 1/4652; H05H 2242/26; B22F 9/14; B22F 2999/00; B22F 2202/13; B33Y 70/00; Y02P 10/25; H01J 37/32357; H01J 37/32669; H01J 37/32449; H01J 37/3266; H01J 37/32816; H01J 37/321; H01J 37/3211; H01J 37/32422; H01J 37/3244; H01J 2237/334
See application file for complete search history.

(56) References Cited

FOREIGN PATENT DOCUMENTS

| | | |
|---|---|---|
| JP | 2010-131577 A | 6/2010 |
| JP | 2012-55840 A | 3/2012 |
| WO | WO-2006/013706 A1 | 2/2006 |

* cited by examiner

MICROPARTICLE PRODUCTION METHOD AND MICROPARTICLE PRODUCTION APPARATUS

TECHNICAL FIELD

The present invention relates to a fine particle production method and a fine particle production apparatus, particularly to a fine particle production method and a fine particle production apparatus for producing fine particles by supplying feedstock for fine particle production into a thermal plasma flame to evaporate the feedstock and convert the feedstock to a mixture in a gas phase, and then cooling the mixture.

BACKGROUND ART

At present, fine particles such as silicon fine particles, oxide fine particles, nitride fine particles and carbide fine particles are used in a wide variety of fields. One example of the method of producing such fine particles is a gas-phase process. Exemplary gas-phase processes include chemical processes in which various gases or the like are chemically reacted at high temperature and physical processes in which a substance is irradiated with an electron beam, laser beam or the like to be decomposed or evaporated, thereby generating fine particles.

Another gas-phase process is a thermal plasma process. The thermal plasma process is a process for producing fine particles by instantly evaporating feedstock in a thermal plasma flame and then rapidly cooling and solidifying the resulting evaporated product. The thermal plasma process has many advantages; for instance, the thermal plasma process is clean and highly productive, provides a high temperature and has a large heat capacity, and therefore is applicable to high melting point materials, so that the thermal plasma process enables relatively easy complexing as compared to other gas-phase processes. Accordingly, the thermal plasma process is actively utilized as the method of producing fine particles.

In a fine particle production method using a conventional thermal plasma process, a feedstock substance is powdered, the powdered feedstock (powdery feedstock, powder) is, together with carrier gas and the like, dispersed and directly supplied thermal plasma flame, whereby fine particles are produced. For fine particle production methods using such a thermal plasma process, several modification examples have been reported (see Patent Literature 1 and Patent Literature 2, for example).

In the technique described in Patent Literature 1 (particularly see claims, paragraph 0061 of the description and FIG. 5 of Patent Literature 1), when feedstock for fine particle production is dispersed, supplied into a thermal plasma flame and evaporated to form a mixture in a gas phase state, and the mixture is cooled to thereby produce fine particles, the amplitude of a coil current used to generate and maintain the thermal plasma flame is modulated to rapidly cool vapor immediately after evaporation of the feedstock by use of an abrupt temperature change caused by plasma constriction. Accordingly, the growth of fine particles generated is suppressed, and finer particles can be obtained.

In the technique described in Patent Literature 2 (particularly see paragraph 0024 of Patent Literature 2), when fine particles are produced by a gas-phase process, feedstock is intermittently supplied into a thermal plasma flame. With this, the bonding growth of particles in vapor can be suppressed.

CITATION LIST

Patent Literature

Patent Literature 1: JP 2010-131577 A
Patent Literature 2: JP 2005-177662 A

SUMMARY OF INVENTION

Technical Problems

Meanwhile, when fine particles are produced, it is desirable that the sizes of obtained fine particles (particle sizes) be uniform, in other words, the width of particle size frequency distribution be narrow. Thus, there is a demand for a fine particle production method capable of obtaining a narrower width of particle size frequency distribution (that is, smaller variations in particle size) whilst taking advantage of the techniques described in Patent Literature 1 and Patent Literature 2.

The present invention has been made in view of the above circumstances and an object of the invention is to provide a fine particle production method capable of producing fine particles with an excellent particle size frequency distribution when the fine particles are produced using a thermal plasma process, as well as a fine particle production apparatus that can be advantageously used when the fine particle production method is carried out.

Solution to Problems

In order to attain the foregoing object, the present invention provides a method of producing fine particles by intermittently supplying feedstock for fine particle production into a thermal plasma flame to evaporate the feedstock and thereby convert the feedstock to a mixture in a gas phase, and then cooling the mixture, the method comprising: generating, as the thermal plasma flame, a modulated induction thermal plasma flame whose temperature state is time-modulated, and periodically switching the modulated induction thermal plasma flame between a high temperature state and a low temperature state having a lower temperature than the high temperature state; supplying the feedstock together with carrier gas while the modulated induction thermal plasma flame is in the high temperature state; and suspending supply of the feedstock and supplying gas whose type is same as the carrier gas while the modulated induction thermal plasma flame is in the low temperature state.

In the method of producing fine particles as above, preferably, the method includes conducting a spectroscopic analysis on light emitted from the modulated induction thermal plasma flame and supplying the feedstock into the modulated induction thermal plasma flame at timing dependent on a result of the spectroscopic analysis.

In the method of producing fine particles as above, preferably, the method includes intermittently supplying the feedstock into the modulated induction thermal plasma flame with the feedstock being dispersed in a particulate form.

In addition, the present invention provides an apparatus for producing fine particles, the apparatus comprising: a feedstock supply section configured to intermittently supply feedstock for fine particle production into a thermal plasma flame; a plasma torch in which the thermal plasma flame is generated, the plasma torch being configured to evaporate, by use of the thermal plasma flame, the feedstock supplied by the feedstock supply section and thereby convert the feedstock to a mixture in a gas phase state; a plasma generation section configured to generate the thermal plasma flame inside the plasma torch; and a gas supply section configured to supply gas into the plasma torch, wherein the plasma generation section generates, as the thermal plasma flame, a modulated induction thermal plasma flame whose temperature state is time-modulated, and periodically switches the modulated induction thermal plasma flame between a high temperature state and a low temperature state having a lower temperature than the high temperature state, wherein the feedstock is, together with carrier gas, supplied into the plasma torch by the feedstock supply section while the modulated induction thermal plasma flame is in the high temperature state, and wherein supply of the feedstock by the feedstock supply section is suspended and the gas whose type is same as the carrier gas is supplied into the plasma torch by the gas supply section while the modulated induction thermal plasma flame is in the low temperature state.

In the apparatus for producing fine particles as above, preferably, the apparatus includes: a spectroscopic analysis section configured to conduct a spectroscopic analysis on light emitted from the modulated induction thermal plasma flame; and a control section configured to control the feedstock supply section based on a result of the spectroscopic analysis by the spectroscopic analysis section such that the feedstock is supplied to the modulated induction thermal plasma flame while the modulated induction thermal plasma flame is in the high temperature state and that supply of the feedstock is suspended while the modulated induction thermal plasma flame is in the low temperature state.

In the apparatus for producing fine particles as above, preferably, the control section controls the gas supply section based on a result of the spectroscopic analysis such that the gas is supplied while the modulated induction thermal plasma flame is in the low temperature state.

In the apparatus for producing fine particles as above, preferably, the feedstock supply section intermittently supplies the feedstock into the modulated induction thermal plasma flame with the feedstock being dispersed in a particulate form.

In the apparatus for producing fine particles as above, preferably, the apparatus includes a chamber connected to a lower end part of the plasma torch, the chamber being configured to cool the mixture to generate the fine particles and to collect the fine particles, wherein the gas supply section supplies the gas such that the gas flows toward a lower end of the plasma torch inside the plasma torch.

Advantageous Effects Of Invention

The fine particle production method and the fine particle production apparatus according to the invention make it possible to produce fine particles with an excellent particle size frequency distribution.

DESCRIPTION OF EMBODIMENTS

A fine particle production method and a fine particle production apparatus according to an embodiment of the present invention (hereinafter called "the embodiment") are described below by reference to appended drawings.

Note that the embodiment described below is a preferred embodiment of the invention but is merely an example, and by no means limits the scope of the invention. In other words, the invention may be modified or improved without departing from the scope and spirit of the invention, and needless to say, the invention includes its equivalents.

Figure 1:
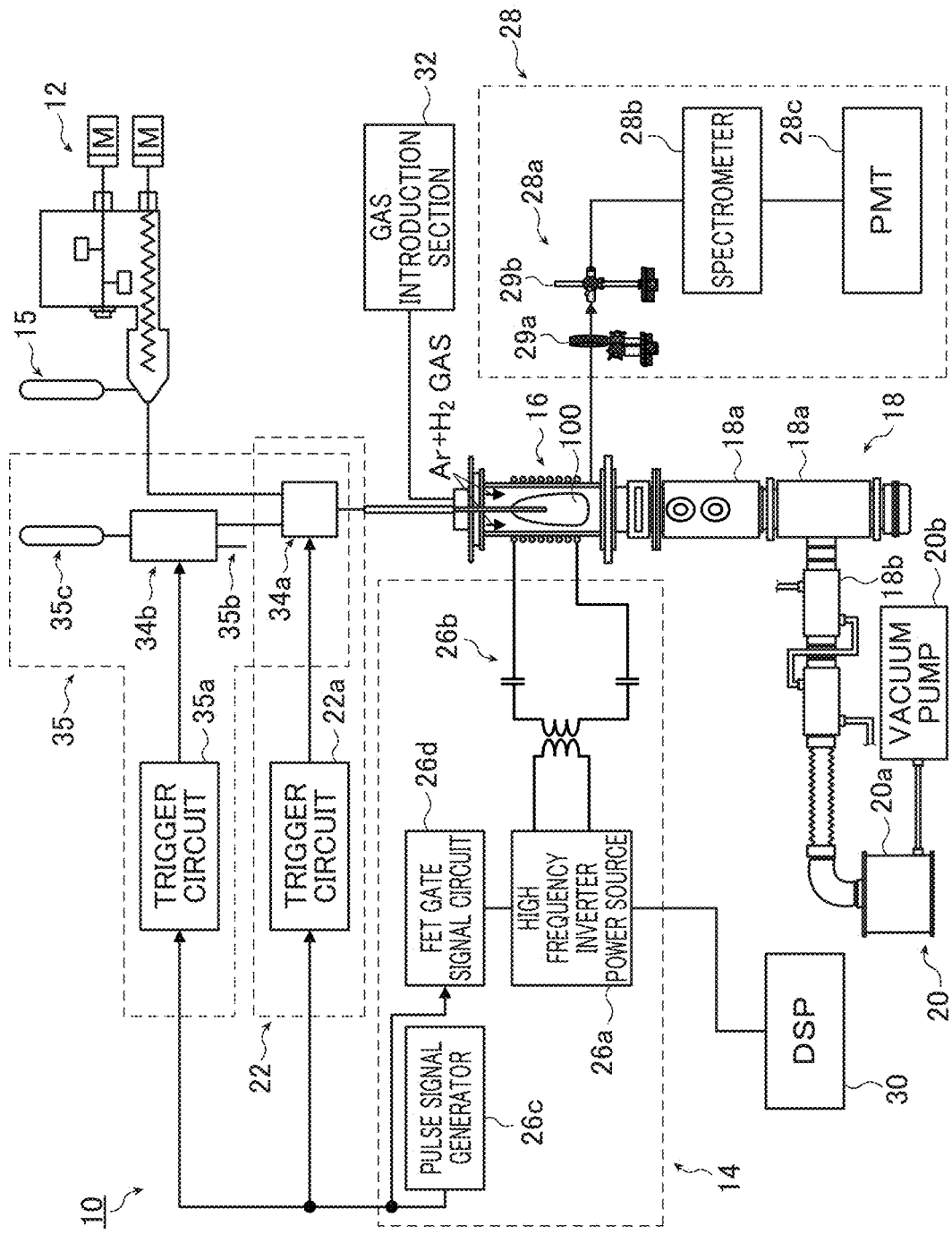
FIG. 1 is a schematic view showing a fine particle production apparatus according to an embodiment of the invention.

First, a general configuration of the fine particle production apparatus (hereinafter called "production apparatus 10") according to the embodiment is described by reference to FIG. 1. FIG. 1 is a schematic view showing the configuration of the production apparatus 10.

The production apparatus 10 is an apparatus producing nanosized fine particles using powdery feedstock, for instance in the embodiment, the production apparatus 10 produces silicon nano particles (hereinafter called "Si nanoparticles") as the fine particles by use of silicon powder (hereinafter called "Si powder") as the feedstock for fine particle production.

As shown in FIG. 1, the production apparatus 10 includes a feedstock supply mechanism 12, a high frequency modulated induction thermal plasma generation section 14, a carrier gas supply source 15, a plasma torch 16, a chamber 18, a collection section 20, an intermittent supply section 22, a plasma spectroscopic analysis section 28, a DSP (Digital Signal Processor) 30, a gas introduction section 32 and a push-out gas supply section 35.

The feedstock supply mechanism 12 and the intermittent supply section 22 constitute a feedstock supply section of the invention and intermittently supply Si powder to a thermal plasma flame generated in the plasma torch 16. In the embodiment, the feedstock supply mechanism 12 and the intermittent supply section 22 constituting the feedstock supply section cooperate together to thereby intermittently supply Si powder, which is the feedstock, to the thermal plasma flame with the Si powder being dispersed in a particulate form. The Si powder supplied into the thermal plasma flame is evaporated and becomes a mixture in a gas phase state. Subsequently, the mixture is cooled (more precisely, rapidly cooled) whereby Si nanoparticles are produced.

The high frequency modulated induction thermal plasma Generation section 14 corresponds to a plasma generation section of the invention and generates a thermal plasma flame in the plasma torch 16. In particular, in the embodiment, a high frequency modulated induction thermal plasma flame (corresponding to a modulated induction thermal plasma flame) whose temperature state is time-modulated is generated. The modulated induction thermal plasma flame is periodically switched between a high temperature state and a low temperature state having a lower temperature than the high temperature state at predetermined time intervals. A thermal plasma flame whose temperature state is not time-modulated is simply called "thermal plasma flame," and a thermal plasma flame whose temperature state is time-modulated and periodically switches between the high temperature state and the low temperature state is called "modulated induction thermal plasma flame 100."

The chamber 18 is a tank connected to the lower end part of the plasma torch 16, and cools (more precisely, rapidly cools) the mixture falling down in the plasma torch 16 to generate Si nanoparticles and collects the generated Si nanoparticles. The collection section 20 is disposed on the further downstream side of the chamber 18. A filter 20a is accommodated in the collection section 20. The Si nanoparticles having passed the chamber 18 and entered the collection section 20 are caught by the filter 20a and thus collected in the collection section 20.

The plasma spectroscopic analysis section 28 corresponds to a spectroscopic analysis section of the invention and is used to conduct a spectroscopic analysis on light emitted from the modulated induction thermal plasma flame 100 in the plasma torch 16. More precisely, the plasma spectroscopic analysis section 28 spectroscopically analyzes, of emitted light from the modulated induction thermal plasma flame 100, light with a wavelength derived from gas supplied to generate the modulated induction thermal plasma flame 100. In the embodiment, the gas for thermal plasma flame generation (specifically, sheath gas) is Ar gas and hydrogen gas. Accordingly, in the embodiment, the plasma spectroscopic analysis section 28 spectroscopically analyzes light with wavelengths derived from ArI that is one emission spectrum of an argon atom andHα that is one emission spectrum of a hydrogen atom.

The DSP 30 corresponds to a control section of the invention and controls the intermittent supply section 22 so as to switch between supply (feeding) and non-supply (non-feeding) of feedstock depending on the temperature state of the modulated induction thermal plasma flame 100. The DSP 30 also controls the push-out gas supply section 35 so as to switch between supply and non-supply of push-out gas to be described later depending on the temperature state of the modulated induction thermal plasma flame 100 based on a result of a spectroscopic analysis.

The gas introduction section 32 supplies sheath gas as the gas for thermal plasma flame generation into the plasma torch 16. In the embodiment, the sheath gas is supplied to flow along the inner wall of the plasma torch 16, whereby the Si powder and the Si nanoparticles are prevented from adhering to the inner wall of the plasma torch 16.

For the sheath gas, Ar (argon) gas, nitrogen gas, hydrogen gas, oxygen gas or the like is used alone or in combination as appropriate; in the embodiment, mixed gas of Ar gas and hydrogen gas is used as the sheath gas.

The push-out gas supply section 35 corresponds to a gas supply section of the invention and supplies push-out Gas into the plasma torch 16 while the feedstock supply is suspended. The push-out gas is one example of gas and is used to push the mixture in a gas phase state out of the place where the thermal plasma flame or the modulated induction thermal plasma flame 100 is formed in the plasma torch 16. In the embodiment, the push-out gas is supplied toward the lower end of the plasma torch 16 inside the plasma torch 16. That is, owing to the supply of the push-out gas into the plasma torch 16, the mixture in a gas base state moves downward in the torch 16.

For the push-out gas, for instance, Ar gas, nitrogen gas, hydrogen gas, oxygen gas or the like is used alone or in combination as appropriate.

Figure 2:
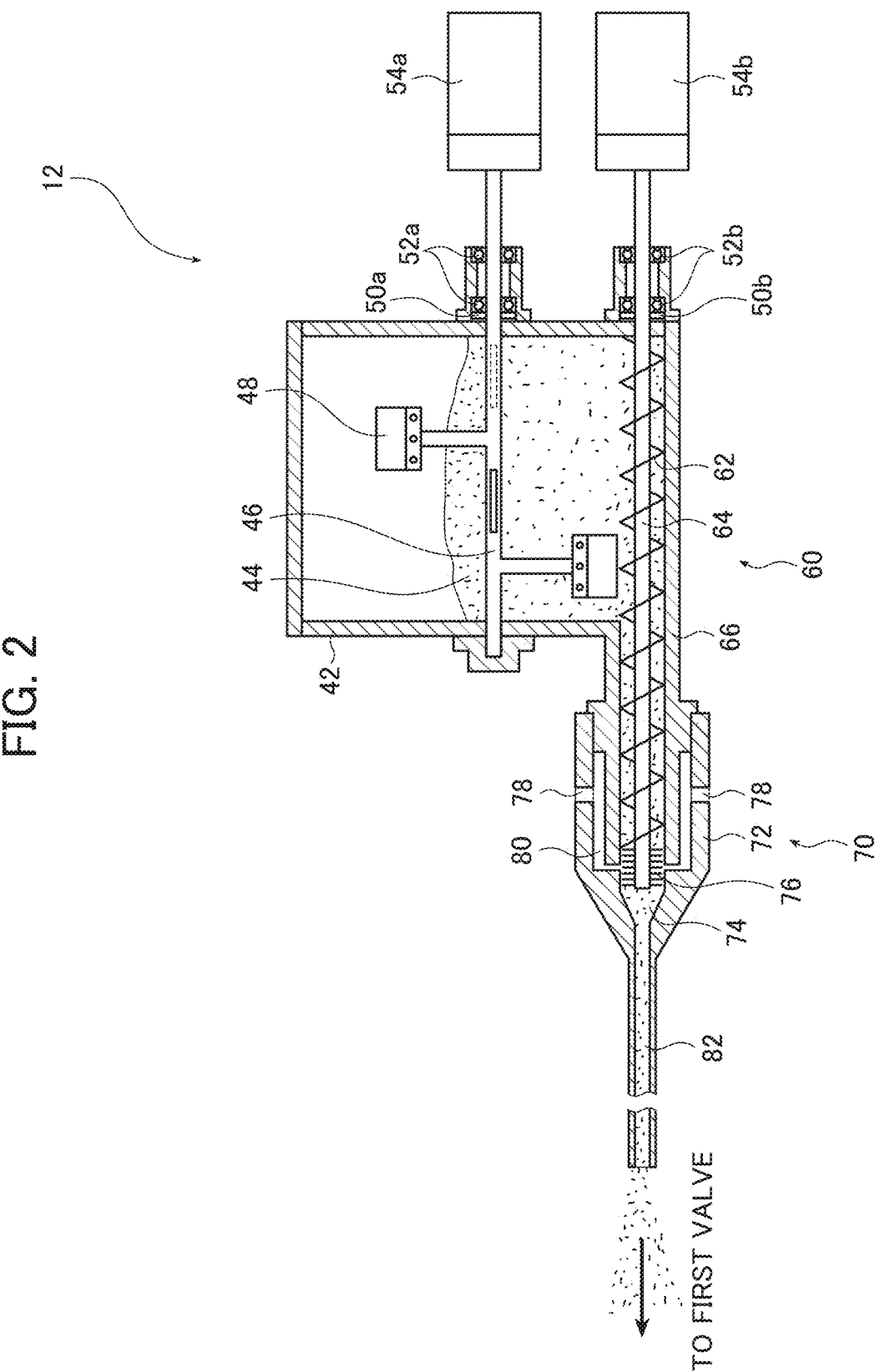
FIG. 2 is a cross-sectional view schematically showing a feedstock supply mechanism of the fine particle production apparatus according to the embodiment of the invention.
Figure 3:
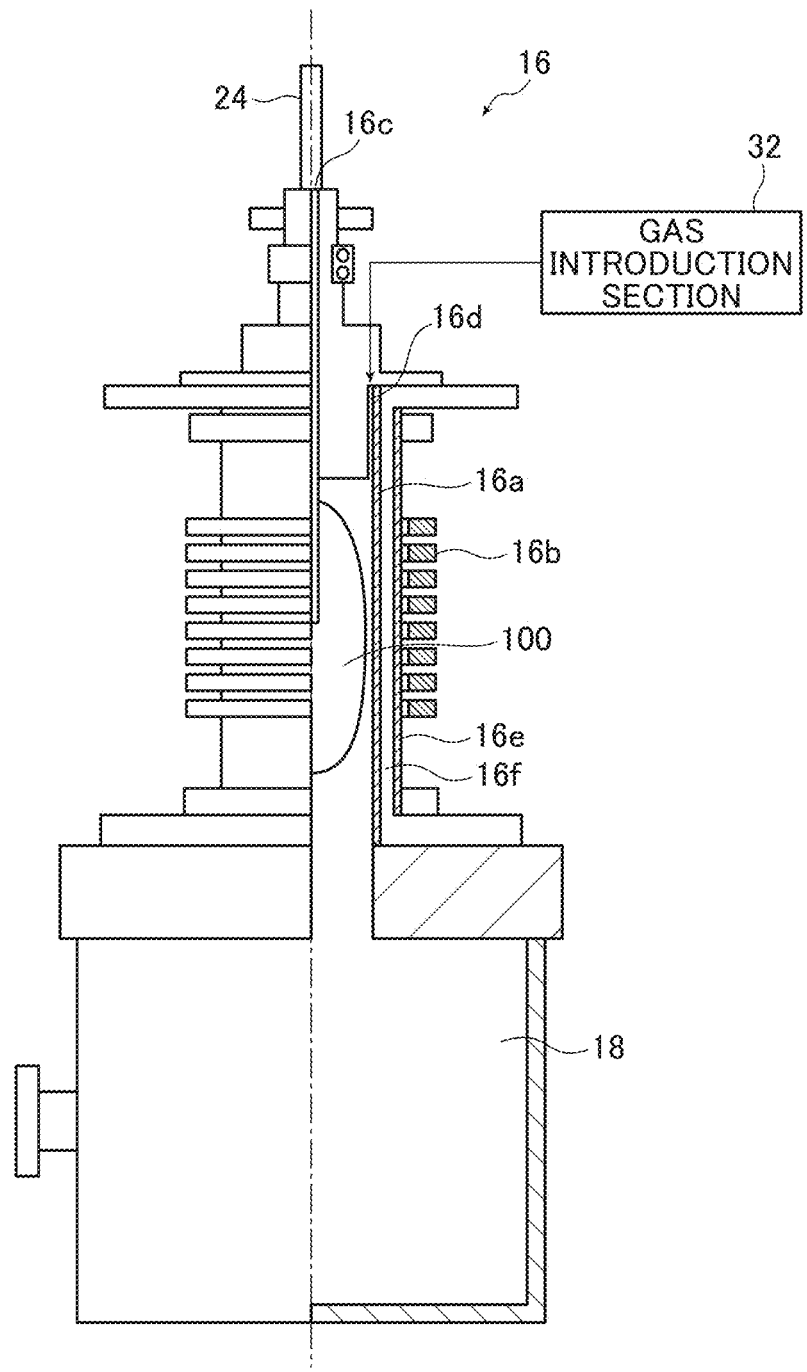
FIG. 3 is a partial cross-sectional view schematically showing a plasma torch of the fine particle production apparatus according to the embodiment of the invention.
Figure 4:
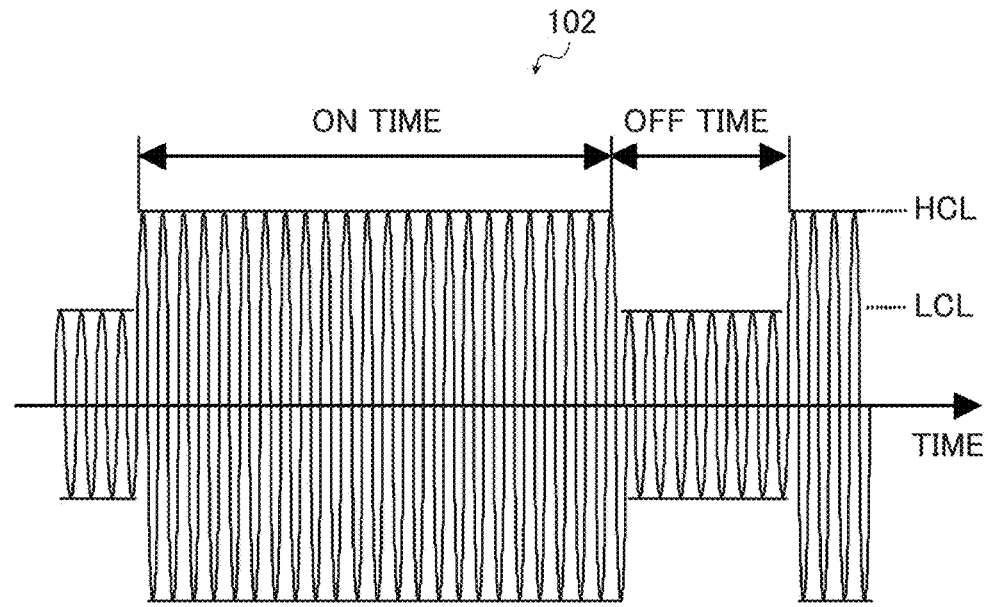
FIG. 4 is an explanatory view illustrating a time-based change of a coil current during pulse modulation.
Figure 5:
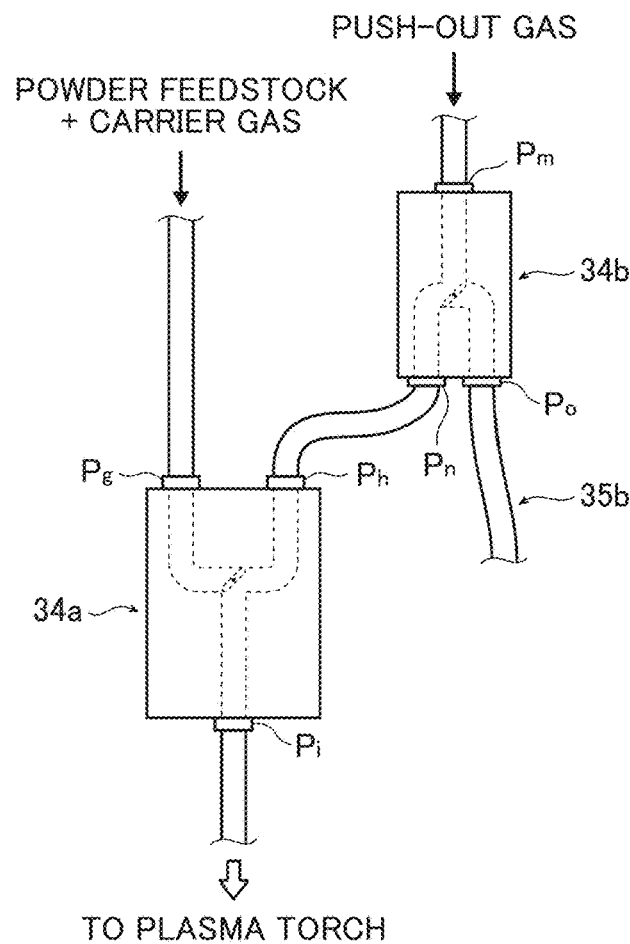
FIG. 5 is a front view schematically showing a first valve and a second valve of the fine particle production apparatus according to the embodiment of the invention.

Next, each portion of the production apparatus 10 is described by reference to FIGS. 2 to 5. FIG. 2 is a cross-sectional view schematically showing the configuration of the feedstock supply mechanism 12. FIG. 3 is a partial cross-sectional view schematically showing the plasma torch 16. FIG. 4 is an explanatory view illustrating the time-based change of a coil current during pulse modulation. FIG. 5 is a front view schematically showing a first valve 34a and a second valve 34b which will be described later.

(Feedstock Supply Mechanism 12)

The feedstock supply mechanism 12 cooperates with the intermittent supply section 22 to supply Si powder together with carrier gas into the thermal plasma flame or the modulated induction thermal plasma flame 100 generated in the plasma torch 16. The feedstock supply mechanism 12 includes a transport pipe 82 shown in FIG. 2. The transport pipe 82 is connected to an inflow port Pg that is one of two inflow ports Pg and Ph of the first valve 34a provided above the plasma torch 16.

For example, in the case where powder is used as the feedstock for fine particle production (which powder is hereinafter also called "powder feedstock 44"), the powder feedstock 44 needs to be dispersed when supplied into the thermal plasma flame or the modulated induction thermal plasma flame 100 generated in the plasma torch 16. Therefore, the powder feedstock 44 is dispersed in carrier gas and supplied. In this case, the feedstock supply mechanism 12 supplies the powder feedstock 44 in a fixed amount into the thermal plasma flame or the modulated induction thermal plasma flame 100 in the plasma torch 16 whilst maintaining the powder feedstock 44 to be in a dispersed state. For the feedstock supply mechanism 12 having such a function, one usable example is the powder dispersing device disclosed in JP 3217415 B owned by the applicant of the present application.

As shown in FIG. 2, the feedstock supply mechanism 12 is mainly composed of a storage tank 42 storing powder feedstock, a screw feeder 60 transporting the powder feedstock in a fixed amount, and a dispersion section 70 dispersing the powder feedstock transported by the screw feeder 60 into the form of primary particles before the powder feedstock is finally sprayed.

The storage tank 42 is provided in its inside with an agitator shaft 46 and agitator blades 48 connected to the agitator shaft 46 for the purpose of preventing the stored powder feedstock 44 from agglomerating. The agitator shaft 46 is installed to be rotatable in the storage tank 42 by use of an oil seal 50a and a bearing 52a. An end of the agitator shaft 46 situated outside The storage tank 42 is connected to a motor 54a whose rotation is controlled by a control device (not shown).

The screw feeder 60 is provided at a lower portion of The storage tank 42 so that the powder feedstock 44 can be transported in a fixed amount. The screw feeder 60 includes and is composed of a screw 62, a shaft 64 of the screw 62, a casing 66, and a motor 54b that is a source of power for rotation of the screw 62. The screw 62 and the shaft 64 are disposed to transverse a lower portion of the inside of the storage tank 42. The shaft 64 is installed to be rotatable in the storage tank 42 by use of an oil seal 50b and a bearing 52b.

An end of the shaft 64 situated outside the storage tank 42 is connected to the motor 54b. The rotation of the motor 54b is controlled by a control device (not shown). Further, there is provided the casing 66 which interconnects an opening at a lower position of the storage tank 42 and the dispersion section 70 and which serves as a tubular path surrounding the screw 62. The casing 66 extends up to an intermediate position of the inside of the dispersion section 70.

As shown in FIG. 2, the dispersion section 70 includes an outer tube 72 engaged and fixed to the outer periphery of a part of the casing 66 and a rotating brush 76 provided at the distal end of the shaft 64, and can carry out the primary dispersion of the powder feedstock 44 having been transported in a fixed amount by the screw feeder 60.

The other end of the outer tube 72 opposite from the engaged and fixed end has a truncated cone shape and contains in its inside a powder dispersion chamber 74 that is also a space of truncated cone shape. That other end is connected with the transport pipe 82 transporting the powder feedstock 44 dispersed in the dispersion section 70. The transport pipe 82 is connected to the inflow port Pg that is one port of the first valve 34a as described above.

The lateral surface of the outer pipe 72 is provided with a gas supply port 78. A space formed by the outer wall of the casing 66 and the inner wall of the outer pipe 72 serves as a gas passage 80 through which supplied gas passes.

The rotating brush 76 is constituted of needle-like members made of a relatively soft material such as nylon or a hard material such as a steel wire. The rotating brush 76 is formed in such a manner that the needle-like members are densely implanted to extend outward in a radial direction of the shaft 64 over the range from the inside of the casing 66 in the vicinity of the end of the casing 66 to the inside of the powder dispersion chamber 74.

In the dispersion section 70, gas for dispersion and transport (carrier gas) supplied from the carrier gas supply source 15 passes the gas supply port 78 and the Gas passage 80 and is elected toward the rotating brush 76 from the outside in a radial direction of the rotating brush 76. With this configuration, the powder feedstock 44 transported an a fixed amount by the feedstock supply mechanism 12 passes among the needle-like members of the rotating brush 76 and is thereby dispersed into the form of primary particles. For the carrier gas, for instance, argon (Ar) gas, nitrogen gas, hydrogen gas or the like is used alone or in combination as appropriate; in the embodiment, Ar Gas is used as the carrier gas.

The transport pipe 82 extends to allow communication between the feedstock supply mechanism 12 and the plasma torch 16 via the intermittent supply section 22. Specifically, one end of the transport pipe 82 is connected to the outer pipe 72, and the other end thereof is connected to the plasma torch 16 via the first valve 34a. The transport pipe 82 has a pipe length ten or more times larger than its pipe diameter and preferably at least has, at its intermediate position, a portion with the pipe diameter that enables a gas flow containing dispersed powder to have a flow velocity of not lower than 20 m/sec. This configuration makes it possible to prevent agglomeration of the powder feedstock 44 having been dispersed into the form of primary particles in the dispersion section 70, so that the powder feedstock 44 can be supplied with its dispersed state being maintained. The powder feedstock 44 is, together with the carrier gas, supplied (sprayed) into the plasma torch 16 via the first valve 34a and a water-cooled probe 24.

Here, the powder feedstock 44 used as the feedstock for fine particle production is the one evaporable in the thermal plasma flame or the modulated induction thermal plasma flame 100 and has a particle size of preferably not more than 100 μm.

(Plasma Torch 16)

The plasma torch 16 generates therein the thermal plasma flame or the modulated induction thermal plasma flame 100 and evaporates feedstock, which is intermittently supplied into the thermal plasma flame or the modulated induction thermal plasma flame 100, by means of the thermal plasma flame or the modulated induction thermal plasma flame 100 so as to convert the feedstock into a mixture in a gas phase state.

As shown in FIG. 3, the plasma torch 16 is composed of a quartz tube 16a and a high frequency oscillation coil 16b surrounding the outside of the quartz tube. A probe insertion port 16c in which the water-cooled probe 24 is inserted is provided at the center portion of the top of the plasma torch 16, and a sheath gas supply port 16d is formed therearound (on the same circumference). The Si powder that is the powder feedstock 44 is, together with the carrier gas, supplied into the plasma torch 16 through the water-cooled probe 24.

The sheath gas supply port 16d is connected to the gas introduction section 32 via, for example, piping which is not shown. The gas introduction section 32 supplies the sheath gas into the plasma torch 16 via the sheath gas supply port 16d.

When a high frequency current having been amplitude-modulated by the high frequency modulated induction thermal plasma generation section 14 is applied to the high frequency oscillation coil 16b in the presence of the sheath gas in the plasma torch 16, the modulated induction thermal plasma flame 100 is generated in the plasma torch 16. When a simple high frequency current is applied to The high frequency oscillation coil 16b by the high frequency modulated induction thermal plasma generation section 14, The thermal plasma flame is generated in the plasma torch 16.

The outside of the quartz tube 16a of the plasma torch 16 is surrounded by a concentrically formed quartz tube 16e, and cooling water 161 is circulated between the quarts tubes 16a and 16e to cool the quartz tube 16a with the water, thereby preventing the quartz tube 16a from having an excessively high temperature due to the thermal plasma flame or the modulated induction thermal plasma flame 100 generated in the plasma torch 16.

In the plasma torch 16, for instance, used is the quartz tube 16a with an inside diameter of 75 mm and a length of 330 mm. For the high frequency oscillation coil 16b, used is an eight-turn coil with an outside diameter of 130 nm, a diameter of a coil conductor of 14 mm, and a coil length of 155 mm. An end of the water-cooled probe 24 is situated between the fourth turn and the fifth turn of the high frequency oscillation coil 16b, for instance.

The coil length of the high frequency oscillation coil 16b of 155 mm is about three times longer than that of a typical coil. One advantage of such a large coil length is that, since a strong electromagnetic field long in the axial direction can be generated, plasma generated thereby is to be long in the axial direction accordingly; thus, this is advantageous in evaporation of the powder feedstock 44 poured from a torch head.

(Chamber 18 and Collection Section 20)

The chamber 18 is a water-cooling type chamber and is connected to the lower end part of the plasma torch 16. The chamber 18 rapidly cools a mixture in a gas phase state that has been formed by evaporating the powder feedstock 44 with the thermal plasma flame or the modulated induction thermal plasma flame 100, thus generating fine particles, and collects the obtained fine particles. That is, the chamber 18a serves as both a cooling tank and a fine particle collector.

As shown in FIG. 1, the chamber 18 includes an upstream chamber 18a situated closer to the plasma torch 16 and a downstream chamber 18b situated away from the plasma torch 16. The upstream chamber 18a is attached to be concentric with the plasma torch 16. The downstream chamber 18b is mounted perpendicularly to the upstream chamber 18a.

On the downstream side of the downstream chamber 18b, provided is a collection section 20 which includes a desired filter 20a for collecting generated fine particles. In the production apparatus 10, a fine particle collection site is the filter 20a. The collection section 20 includes a collection chamber having the filter 20a, and a vacuum pump 20b connected through a pipe provided at a lower portion of the collection chamber. The fine particles having passed the chamber 18 are sucked by the vacuum pump 20b to be introduced into the collection chamber, and those fine particles remaining on the surface of the filter 20a are collected.

The ambient pressure inside the plasma torch 16 is preferably not higher than atmospheric pressure. The atmosphere of not higher than atmospheric pressure is not particularly limited and may range from 5 Torr to 750 Torr, for example.

(High Frequency Modulated Induction Thermal Plasma Generation Section 14)

The high frequency modulated induction thermal plasma generation section 14 supplies the high frequency oscillation coil 16b with a high frequency current for Generating the modulated induction thermal plasma flame 100. The high frequency modulated induction thermal plasma generation section 14 according to the embodiment is capable of, at predetermined time intervals, amplitude-modulating the high frequency current to be supplied to the high frequency oscillation coil 16b. The high frequency current supplied to the high frequency oscillation coil 16b to Generate the modulated induction thermal plasma flame 100 is hereinafter called "coil current."

As shown in FIG. 1, the high frequency modulated induction thermal plasma generation section 14 includes a high frequency inverter power source 26a, an impedance matching circuit 26b, a pulse signal Generator 26c and an FET (Field-Effect Transistor) gate signal circuit 26d.

The high frequency inverter power source 26a is a MOSFET (Metal-Oxide-Semiconductor Field-Effect Transistor) inverter power source with 450 kHz basic frequency, 50 kW maximum power, 150V rated voltage and 460 A rated current. Whilst the frequency used for induction thermal plasma generated by means of a vacuum tube power source is typically several megahertz, the power source used as the high frequency inverter power source 26a is one with the frequency f=450 kHz.

The MOSFET inverter power source constituting the high frequency inverter power source 26a has 90% power conversion efficiency that is higher than 30% to 60% efficiency of conventional vacuum tube power supplies, thus overcoming a defect of ICP (Inductively Coupled Plasma), that is, low energy efficiency. The MOSFET inverter power source also has the function of modulating the amplitude of electric current. In other words, the MOSFET inverter power source can amplitude-modulate the coil current.

The high frequency inverter power source 26a is composed of, for instance, a rectifier circuit and a MOSFET inverter circuit, neither of which is shown. In the high frequency inverter power source 26a, the rectifier circuit uses, for example, a three-phase alternating current as the input power; the three-phase alternating current is converted from the alternating current to the direct current through a three-phase full-wave rectifier circuit, and the output voltage value thereof is changed through a DC-DC converter using an IGBT (Insulated Gate Bipolar Transistor).

The MOSFET inverter circuit is connected to the rectifier circuit and converts the direct current obtained from the rectifier circuit into the alternating current. Thus, the inverter output, i.e., the coil current is amplitude-modulated (AM-modulated).

The output side of the high frequency inverter power source 26a is connected with the impedance matching circuit 26b. The impedance matching circuit 26b is constituted of a series resonant circuit composed of a capacitor and a resonant coil, neither of which is shown, and carries out impedance matching such that a resonance frequency of load impedance including plasma load falls within a drive frequency range of the high frequency inverter power source 26a.

The pulse signal generator 26c generates a pulse control signal for adding square wave modulation to the amplitude of the coil current used to maintain a high frequency modulated induction thermal plasma flame.

The FET gate signal circuit 26d supplies a modulation signal based on a pulse control signal generated by the pulse signal generator 26c, to the gate of a MOSFET of the MOSFET inverter circuit of the high frequency inverter power source 26a. Thus, the coil current can be amplitude-modulated by use of a pulse control signal generated by the Pulse signal generator 26c such that the amplitude relatively increases or decreases, and for example, the coil current can be pulse-modulated as in a square wave 102 shown in FIG. 4. By pulse-modulating the coil current, the modulated induction thermal plasma flame 100 can be periodically switched between the high temperature state and the low temperature state at predetermined time intervals.

When the high frequency modulated induction thermal plasma generation section 14 supplies a simple high frequency current to the high frequency oscillation coil 16b, the thermal plasma flame is generated.

In the square wave 102 shown in FIG. 4, the high value of the current amplitude of the coil current is represented by HCL, and the low value thereof is represented by LCL. In addition, in one modulation cycle, time with HCL is defined as ON time, and time with LCL is defined as OFF time. Further, the percentage of the ON time (ON time/(ON time+OFF time)×100(%)) in one modulation cycle is defined as a duty factor (DF). The current amplitude factor (LCL/HCL×100(%)) of the coil is defined as a current modulation factor (SCL).

The ON time, the OFF time, and one cycle stated above are each preferably on the order of milliseconds to several seconds.

When the coil current is amplitude-modulated using a pulse control signal, the amplitude modulation is preferably carried out using a predetermined waveform, e.g., a square wave. However, the waveform is not limited to a square wave, and needless to say, use may be made of a waveform formed of a triangle wave, a sawtooth wave, a reverse sawtooth wave, or a repetitive wave including a curved line having a sine wave or the like.

(Intermittent Supply Section 22)

The intermittent supply section 22 intermittently supplies, into the plasma torch 16, the powder feedstock 44 transported from the feedstock supply mechanism 12. As shown in FIG. 1, the intermittent supply section 22 includes a trigger circuit 22a and the first valve 34a. The trigger circuit 22a is connected to the pulse signal generator 26c and generates a TIL (Transistor-Transistor Logic) level signal (hereinafter called "first valve signal") based on a pulse control signal received from the pulse signal generator 26c.

The first valve 34a is constituted of, for instance, a solenoid valve (electromagnetic valve). An electrical part (solenoid part) of the first valve 34a is connected to the trigger circuit 22a and switches an open path inside a valve body based on the voltage value of the first valve signal sent from the trigger circuit 22a.

As shown in FIG. 5, the body part of the first valve 34a has two inflow ports Pg and Ph and one outflow port Pi. One inflow port Pg is connected with an end of the transport pipe 82. The other inflow port Ph is connected with the push-out gas supply section 35 via the second valve 34b. The outflow port Pi is connected to the upstream end of the water-cooled probe 24.

In the first valve 34a, only either of the two inflow ports Pg and Ph communicates with the outflow port Pi. When the inflow port Pg is allowed to communicate with the outflow port Pi, a supply path for the feedstock opens inside the first valve 34a. Consequently, the powder feedstock 44 transported through the transport pipe 82, together with the carrier gas, flows out from the outflow port Pi and is supplied into the plasma torch 16.

In contrast, when the inflow port Ph is allowed to communicate with the outflow port Pi, the supply path for the feedstock is closed inside the first valve 34a. Consequently, the supply of the powder feedstock 44 into the plasma torch 16 stops. Thus, since the inflow port communicating with the outflow port Pi is switched between the inflow ports Pg and Ph, the powder feedstock 44 is intermittently supplied into the plasma torch 16.

When the inflow port Ph communicates with the outflow port Pi, i.e., when the supply of the powder feedstock 44 is suspended, a supply path for the push-out gas is open inside the first valve 34a. Consequently, the push-out gas sent from the push-out gas supply section 35 flows out from the outflow port Pi and is supplied into the plasma torch 16.

Which one of the two inflow ports Pg and Ph is allowed to communicate with the outflow port Pi in the first valve 34a is determined depending on the voltage value (voltage level) of the first valve signal received from the trigger circuit 22a. The inflow port communicating with the outflow port Pi is switched at predetermined time intervals. Specifically, when the voltage value of the first valve signal becomes a high level, the inflow port Pg connected with the transport pipe 82 is allowed to communicate with the outflow port Pi. This makes the supply path for the feedstock open and the supply path for the push-out gas closed. As a result, the powder feedstock 44 is, together with the carrier gas, supplied into the plasma torch 16. In the embodiment, the first valve signal is generated such that the powder feedstock 44 is supplied into the plasma torch 16 while the modulated induction thermal plasma flame 100 is in the high temperature state.

When the voltage value of the first valve signal becomes a low level, after a slight delay from that time point, the inflow port Ph opposite from the one connected with the transport pipe 82 is allowed to communicate with the outflow port Pi. This makes the supply path for the feedstock closed and the supply path for the push-out gas open. As a result, the supply of the powder feedstock 44 stops, and the push-out gas is supplied into the plasma torch 16. In the embodiment, the first valve signal is generated such that the supply of the powder feedstock 44 stops and the push-out gas is supplied into the plasma torch 16 while the modulated induction thermal plasma flame 100 is in the low temperature state.

(Push-Out Gas Supply Section 35)

The push-out gas supply section 35 supplies the push-out gas into the plasma torch 16 while the supply of the powder feedstock 44 into the plasma torch 16 is suspended. The push-out gas supply section 35 according to the embodiment supplies the push-out gas from a push-out gas supply source 35c. In the embodiment, the same type of gas as the carrier gas, namely, Ar gas is supplied as the push-out gas.

Whilst the push-out Gas supply source 35c and the carrier gas supply source 15 are separately provided in the embodiment, the invention is not limited thereto, and the carrier gas and the push-out gas may be supplied from a shared supply source.

The push-out gas supply section 35 it composed of the push-out gas supply source 35c, the above-described first valve 34a, and a trigger circuit 35a and the second valve 34b which are shown in FIGS. 1 and 5. The trigger circuit 35a is connected to the pulse signal generator 26c and generates a TTL level signal (hereinafter called "second valve signal") based on a pulse control signal received from the pulse signal generator 26c.

The second valve 34b is constituted of, for instance, a solenoid valve (electromagnetic valve). An electrical part (solenoid part) of the second valve 34b is connected to the trigger circuit 35a and switches an open path inside a valve body based on the voltage value of the second valve signal sent from the trigger circuit 35a.

As shown in FIG. 5, the body part of the second valve 34b has one inflow port Pm and two outflow ports Pn and Po. The inflow port Pm is connected to the push-out gas supply source 35c via a pipe or a tube. One outflow port Pn of the two outflow ports Pn and Po is connected to the inflow port. Ph of the first valve 34a via a pipe or a tube. The other outflow port Po is connected with a purge line 35b.

In the second valve 34b, only either of the two outflow ports Pn and Po communicates with the inflow port Pm. When the inflow port Pm communicates with the outflow port Pn, Ar gas as the push-out gas sent from the push-out gas supply source 35c flows out from the outflow port Pn and is supplied into the plasma torch 16 via the first valve 34a. When the inflow port Pm communicates with the outflow port Po, Ar gas sent from the push-out gas supply source 35c flows out from the outflow port Po and is then discharged to a purge tank (not shown) through the purge line 35b.

Which one of the two outflow ports Pn and Po is allowed to communicate with the inflow port Pm in the second valve 34b is determined depending on the voltage value (voltage level) of the second valve signal received from the trigger circuit 35a. The outflow port communicating with the inflow port Pm is switched at predetermined time intervals. Specifically, when the voltage value of the second valve signal becomes a high level, after a slight delay from that time point, the outflow port Pn connected to the first valve 34a is allowed to communicate with the inflow port Pm. Consequently, the push-out gas flows up to the position immediately anterior to the first valve 34a. In this state, when the supply path for the push-out gas in the first valve 34a is opened, the push-out gas supplied into the plasma torch 16 through the water-cooled probe 24.

The push-out gas is supplied into the plasma torch 16 to be directed toward the lower end of the plasma torch 16.

When the voltage value of the second valve signal becomes a low level, after a slight delay from that time point, the outflow port Po connected to the purge line 35b is allowed to communicate with the inflow port Pm. Consequently, the push-out gas is discharged to the purge tank through the purge line 35b. Thus, in the embodiment, while the supply of the push-out gas into the plasma torch 16 is suspended, the push-out gas is discharged through the purge line 35b, so that the push-out gas is always present in the second valve 34h. As a result, when the supply of the push-cut gas is restarted after the tightly closed state of the second valve 34b, the phenomenon in which the push-out gas suddenly flows into the second valve 34b and collides against the inside of the valve (so-called hammering phenomenon) can be avoided. However, the invention is not limited thereto, and the purge line 35b may not be connected to the second valve 34b. In this case, the second valve 34b may be a simple open-close valve of on-off type. Aside from that, for the purpose of minimizing a waste of the push-out gas, it is preferable to adjust the purge flow rate to a favorable value by regulating the valve opening or by other means.

(Plasma Spectroscopic Analysis Section 28)

The plasma spectroscopic analysis section 28 conducts a spectroscopic analysis on light emitted from the modulated induction thermal plasma flame 100 in the plasma torch 16, and for instance, measures the spectral intensity of the modulated induction thermal plasma flame 100. As shown in FIG. 1, the plasma spectroscopic analysis section 28 includes an optical system 28a, a spectrometer 28b and a PMT (Photomultiplier Tube) 28c. The spectrometer 28b and the PMT 28c are interconnected. The PMT 28c is also connected to the DSP 30.

As shown in FIG. 1, the optical system 28a includes a lens 29a and a light guiding part 29b such as an optical fiber. Light of a thermal plasma flame (more precisely, modulated induction thermal plasma flame 100) is incident on the light guiding part 29b via the lens 29a.

The spectrometer 28b is connected to the light guiding part 29b and, when emitted light of the modulated induction thermal plasma flame 100 is incident, disperses the emitted light of the modulated induction thermal plasma flame 100 at predetermined time intervals.

The PMT 28c comprises a photomultiplier tube and, when an optical spectrum of emitted light of the modulated induction thermal plasma flame 100 is input at predetermined time intervals, amplifies the input at a predetermined magnification and outputs the resultant to the DSP 30.

(DSP 30)

The DSP 30 controls the temperature state of the modulated induction thermal plasma flame 100 in accordance with the timing of supply of the powder feedstock 44. Specifically, the DSP 30 feedback-controls the temperature state of the modulated induction thermal plasma flame 100 in such a manner that the high temperature state is established while the powder feedstock 44 is supplied and the low temperature state is established while the supply of the powder feedstock 44 is suspended.

More specifically, the trigger circuits 22a and 35a generate a first valve signal based on the waveform of a pulse control signal sent from the pulse signal generator 26c. Along with this, the DSP 30 calculates the amount of shift in timing between the pulse control signal sent from the pulse signal generator 26c and the radiant intensity of light with a wavelength derived from gas for thermal plasma flame generation. Based on the calculated amount of shift, the DSP 30 outputs a control signal that acts to modify the phase of a modulation signal to be supplied to the gate of the MOSFET of the MOSFET inverter circuit provided in the high frequency inverter power source 26a of the high frequency modulated induction thermal plasma generation section 14, the high-level time and the low-level time of the modulation signal, and the like to be proper. That is, a control signal that enables the square wave 102 to have adequate ON time length, OFF time length and duty factor is output.

With the foregoing procedures, the temperature state of the modulated induction thermal plasma flame 100 is feedback-controlled in such a manner that the high temperature state is established while the powder feedstock 44 is supplied and the low temperature state is established while the supply of the powder feedstock 44 is suspended.

Whilst in the embodiment, the temperature state of the modulated induction thermal plasma flame 100 is controlled in accordance with the timing of supply of the powder feedstock 44 as described above, the invention is not limited thereto. For example, the DSP 30 may control the timing of supply of the powder feedstock 14 in accordance with modulation of the temperature state of the modulated induction thermal plasma flame 100. In this case, the DSP 30 can control the intermittent supply section 22 and the push-out gas supply section 35 by switching between opening and closing of each of the first valve 34a and the second valve 34b based on a result of the spectroscopic analysis by the plasma spectroscopic analysis section 28, In other words, the powder feedstock 44 may be supplied to the modulated induction thermal plasma flame 100 at timing dependent on a result or the spectroscopic analysis. More specifically, the DSP 30 may control the intermittent supply section 22 and the push-out gas supply section 35 based on a result of the spectroscopic analysis such that the powder feedstock 44 is supplied while the modulated induction thermal plasma flame 100 is in the high temperature state and that the supply of the powder feedstock 44 is suspended and the push-out gas is supplied while the modulated induction thermal plasma flame 100 is in the low temperature state.

However, the control based on the spectroscopic analysis may not be carried out. That is, the timing of supply of the powder feedstock 44 and the timing of supply of the push-out gas need not be controlled based on the emission spectrum of the modulated induction thermal plasma flame 100. For instance, the timing of switching the temperature state of the modulated induction thermal plasma flame 100 (i.e., between the ON time and the OFF time in the modulation cycle of the coil current) may be determined in advance, and the timing of supply of the powder feedstock 44 and the timing of supply of the push-out gas may be controlled using a timer in accordance with the switching timing previously determined.

Next, the method of producing fine particles using the production apparatus 10 of the embodiment (that is, the fine particle production method according to the embodiment) is described by reference to FIGS. 6 and 7A to 7C.

Figure 6:
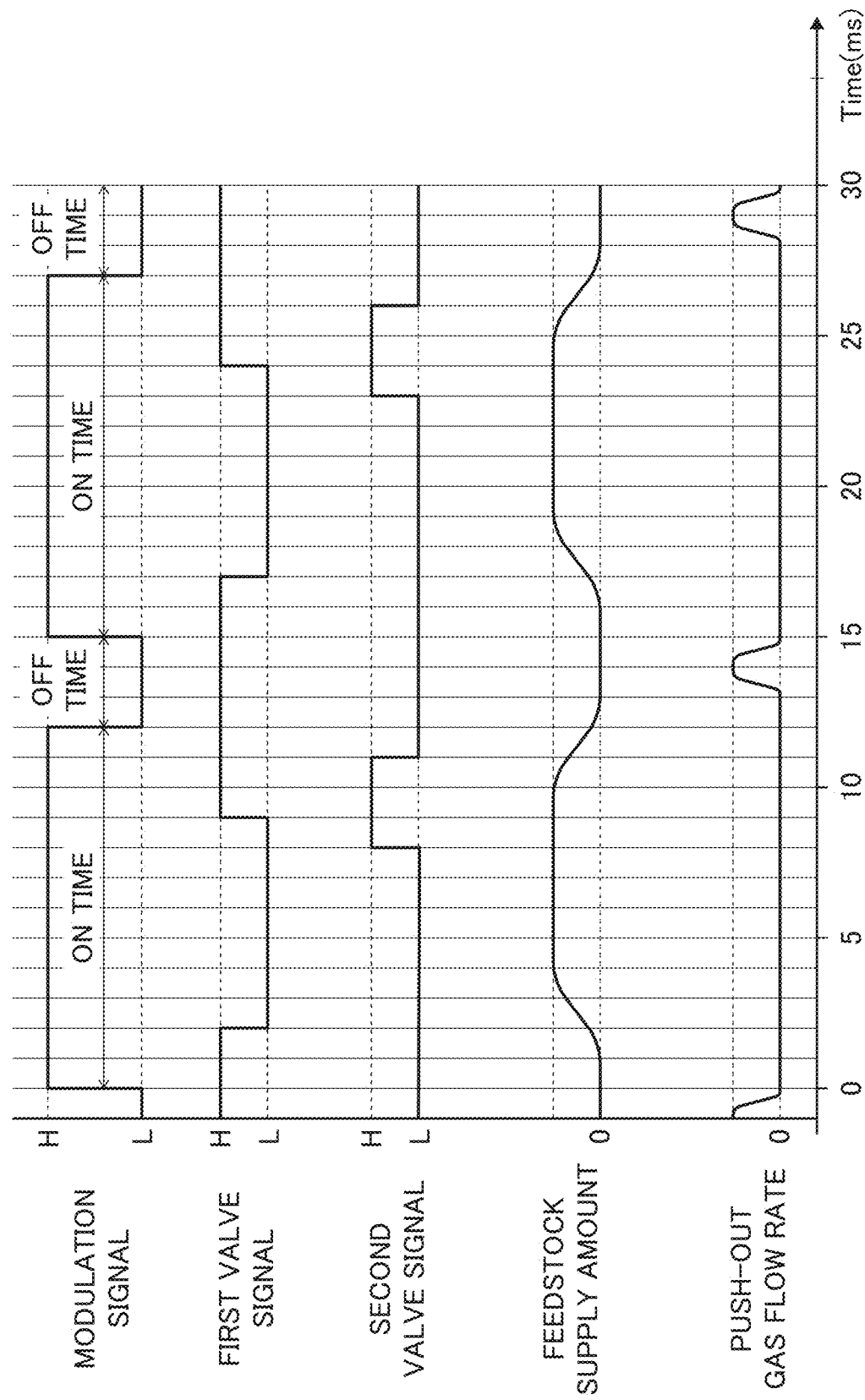
FIG. 6 is a timing chart showing periodical changes of a modulation signal for the coil current, a first valve signal, a second valve signal, a feedstock supply amount and a push-out gas supply amount.

FIG. 6 is a timing chart showing periodical changes of a modulation signal for the coil current, a first valve signal, a second valve signal, a feedstock supply amount and a push-out gas supply amount. FIG. 6 shows the chart covering two cycles.

Figure 7A:
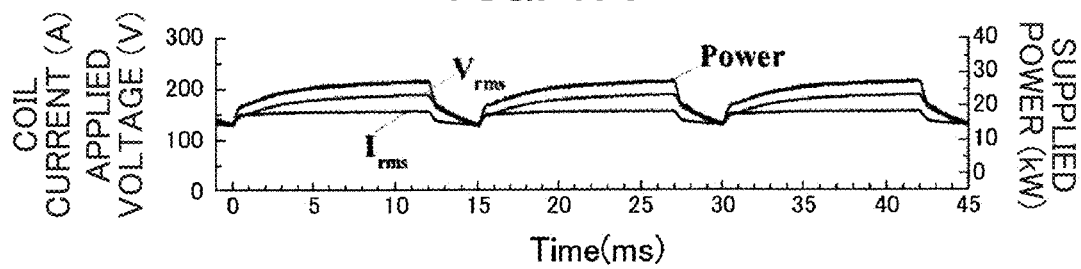
FIG. 7A is a diagram showing periodical variations in applied voltage at a coil, the coil current and coil supply power.

FIG. 7A is a diagram showing periodical variations in PMS (Root Mean Square) of applied voltage at the high frequency oscillation coil 16b, RMS of the coil current, and supplied power.

Figure 7B:
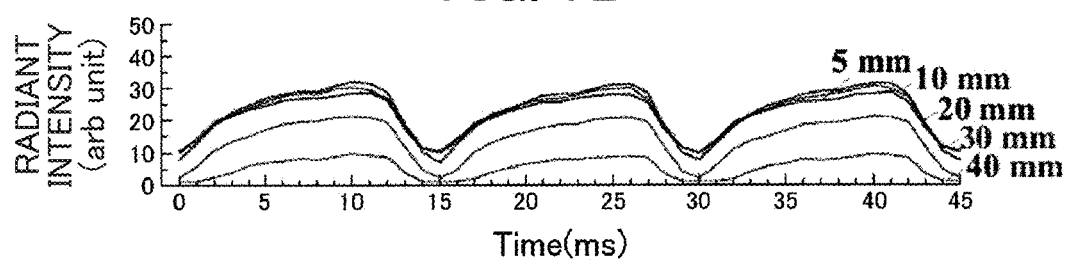
FIG. 7B is a diagram showing periodical variations in radiant intensities of light derived from ArI, which are obtained from results of spectroscopic analysis of light emitted from a modulated induction thermal plasma flame.
Figure 7C:
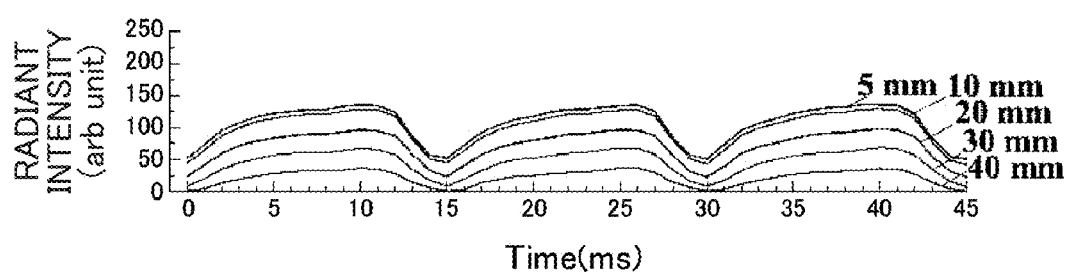
FIG. 7C is a diagram showing periodical variations is radiant intensities of light derived from Hα, which are obtained from results of spectroscopic analysis of light emitted from a modulated induction thermal plasma flame.

FIGS. 7B and 7C are diagrams showing periodical variations of results of spectroscopic analysis on, of light emitted from the modulated induction thermal plasma flame 100, light with wavelengths derived from gases for thermal plasma flame generation. FIG. 7B shows periodical variations in radiant intensities of light derived from ArI, and FIG. 7C shows periodical variations in radiant intensities of light derived from Hα. The five graphs shown in each of FIGS. 7B and 7C represent radiant intensities at respective positions 5 mm, 10 mm, 20 mm, 30 mm and 40 mm away downward from the terminus of the high frequency oscillation coil 16b, the positions being on the torch central axis of the plasma torch 16. FIGS. 7A to 7C show periodical variations in three cycles.

The following description is made taking as an example the case where Si powder is used as the powder feedstock 44 to thereby produce Si nanoparticles. In the following, it is assumed that one cycle time is set to 15 milliseconds (ms) and the start time point (0 ms time point) of each cycle is set to the start time of the ON time in the modulation cycle of the coil current. However, the one cycle time and the start time of the ON time in each cycle may be arbitrarily set.

The Si powder as the feedstock for fine particle production supplied from the feedstock supply mechanism 12 is, together with Ar Gas as the carrier Gas supplied from the carrier gas supply source 15, transported into the first valve 34a through the inflow port Pg. When the inflow port Pg is allowed to communicate with the outflow port Pi in this state, the Si powder dispersed in a particulate form is, together with the carrier gas, supplied into the plasma torch 16.

In addition, the push-out gas supplied under pressure from the push-out gas supply section 35 is transported into the second valve 34b through the inflow port Pm. When the inflow port Pm is allowed to communicate with the outflow port Pn and the inflow port Ph of the first valve 34a is allowed to communicate with the outflow port Pi in this state, the push-out gas is supplied into the plasma torch 16 to flow toward the lower end of the plasma torch 16. In contrast, when the inflow port Pm is allowed to communicate with the outflow port Po, the push-out gas is discharged to the purge tank through the purge line 35b.

In the high frequency modulated induction thermal plasma generation section 14, a pulse control signal is sent from the pulse signal generator 26c to the FIT gate circuit 26d, the trigger circuit 22a of the intermittent supply section 22, and the trigger circuit 35a of the push-out gas supply section 35.

Upon receipt of the pulse control signal, the FET gate circuit 26d sends a modulation signal generated based on the pulse control signal to the high frequency inverter power source 26a. In the embodiment, for instance, a modulation signal that defines the period from 0 ms (cycle start time) to 12 ms of each cycle as the ON time and the period from 12 ms to 15 ms (cycle end time) as the OFF time as shown in FIG. 6 is output. When this modulation signal is supplied to the gate of the MOSFET of the MOSSFET inverter circuit of the high frequency inverter power source 26a, the applied voltage at the high frequency oscillation coil 16b, the coil current and the coil supply power are pulse-modulated as shown in FIG. 7A.

At this time, mixed gas of Ar gas and hydrogen gas supplied as the sheath gas from the gas introduction section 32 into the plasma torch 16. As a consequence, the modulated induction thermal plasma flame 100 is generated in the plasma torch 16. The modulated induction thermal plasma flame 100 periodically assumes the high temperature state and the low temperature state at predetermined time intervals due to the pulse-modulated coil current.

In the embodiment, emitted light of the modulated induction thermal plasma flame 100 is spectroscopically analyzed with the plasma spectroscopic analysis section 28.

Describing results of spectroscopic analysis, as shown in FIGS. 7B and 70, it can be understood that each of radiant intensities of light derived from gases for thermal plasma flame generation (specifically, light derived from ArI and light derived from Hα) changes in synchronization with the amplitude modulation of the coil current. From this, it can be said that since the coil current is pulse-modulated, the modulated induction thermal plasma flame 100 is periodically switched between the high temperature state and the low temperature state at the predetermined time intervals. More specifically, the modulated induction thermal plasma flame 100 assumes the high temperature state during the ON time (0 ms to 12 ms of each cycle) in the modulation cycle of the coil current and the low temperature state during the OFF time (12 ms to 15 ms of each cycle).

Further, in the embodiment, the temperature state of the modulated induction thermal plasma flame 100 is modulated in accordance with the timing of supply of the Si powder; specifically, the Si powder is supplied into the plasma torch 16 while the modulated induction thermal plasma flame 100 is in the high temperature state.

Now, regarding the supply of the Si powder, the opening and closing timing of the first valve 34a is described in relation to the modulation cycle of the coil current. As shown in FIG. 6, a first valve signal sent from the trigger circuit 22a to the first valve 34a becomes the high level at a time point delayed from (i.e., about 9 ms after) the start time point of the ON time. The amount of shift above is almost equal to the time from the start of the ON time to the time when the radiant intensities of ArI and Hα become local maxima (see FIGS. 7B and 7C).

Upon receipt of the first valve signal, the first valve 34a operates in accordance with the first valve signal, and the inflow port Pg on the feedstock supply side, is allowed to commune with the outflow port Pi at the time when the voltage value becomes the high level (for instance, at the time point of 9 ms in FIG. 6). Thereafter, at a time point after a slight time lag (for instance, at the time point of 16 ms in FIG. 6), the supply of the Si powder together with the carrier gas to the modulated induction thermal plasma flame 100 in the plasma torch 16 starts, and the amount of the supply gradually increases.

The other inflow port Ph is allowed to communicate with the outflow port Pi at the time when the voltage value of the first valve signal becomes the low level (for instance, at the time point of 17 ms in FIG. 6). In other words, the supply path for the feedstock is closed inside the first valve 34a. Accordingly, the amount of supply of the Si powder gradually decreases, and after a while (for instance, at the time point of 28 ms in FIG. 6), the supply of the Si powder stops.

In the cycle shown in FIG. 6, 0 ms to 12 ms and 15 ms to 27 ms are the ON time, that is, the period of time when the modulated induction thermal plasma flame 100 is in the high temperature state, whilst 12 ms to 15 ms and 27 ms to 30 ms are the OFF time, that is, the period of time when the modulated induction thermal plasma flame 100 is in the low temperature state. Thus, when the first valve 34a is opened and closed as described above, the Si powder is, together with the carrier gas, intermittently supplied; more specifically, the Si powder is supplied while the modulated induction thermal plasma flame 100 is in the high temperature state, whereas the supply of the Si powder is suspended while the flame 100 is in the low temperature state.

In the embodiment, while the modulated induction thermal plasma flame 100 is in the low temperature state, the push-out gas is supplied into the plasma torch 16 whilst the supply of the Si powder 44 is suspended.

Now, regarding the supply of the push-out gas, the opening and closing timing of the first valve 34a and the second valve 34b is described in relation to the modulation cycle of the coil current. As shown in FIG. 6, a second valve signal sent from the trigger circuit 35a to the second valve 34b becomes the high level at a time point earlier than (i.e., about 4 ms before) the start time point of the OFF time of the modulation cycle. The amount of shift above is almost equal to the time from the start of the OFF time to the time when the radiant intensities of ArI and Hα become local minima (see FIGS. 7B and 7C).

Upon receipt of the second valve signal, the second valve 34b operates in accordance with the second valve signal, and the outflow port Pn connected to the first valve 34a is allowed to communicate with the inflow port Pm at the time when the second valve signal becomes the high level (for instance, at the time point of 23 ms in FIG. 6). At this time, since the voltage value of the first valve signal is in the low level as shown in FIG. 6, the inflow port Ph communicates with the outflow port Pi inside the first valve 34a, so that the supply path for the push-out gas is open. Accordingly, the push-out gas passes the first valve 34a and the second valve 34b, and at a time point after a slight time lag from this (for instance, at the time point of 28.5 ms in FIG. 6), the supply of the push-out gas into the plasma torch 16 starts. The push-out gas flows downward so as to push a mixture in a gas phase state out of the place where the modulated induction thermal plasma flame 100 is formed in the plasma torch 16.

When the voltage value of the second valve signal turns from the high level to the low level, at this time point (for instance, at the time point of 26 ms in FIG. 6.), the outflow port Po of the second valve 34b is allowed to communicate with the inflow port Pm. At this time, the first valve signal is in the high level, and the supply path for the push-out gas is closed in the first valve 34a. Therefore, the push-out gas does not pass the first valve 34a and is discharged through the purge line 35b. An on-off valve (not shown) may be provided at the distal end of the purge line 35b, and the opening and closing of the on-off valve may be periodically switched to intermittently discharge the push-out gas while the outflow port Po of the second valve 34b communicates with the inflow port Pm.

Owing to the operations of the first valve 34a and the second valve 34b as above, the push-out gas is temporarily supplied into the plasma torch 16 during a certain period of time (for instance, from 28.5 ms to 30 ms in FIG. 6). As shown in FIG. 6, the period of time when the push-out gas is supplied into the plasma torch 16 corresponds to the OFF time, i.e., a period of time when the modulated induction thermal plasma flame 100 is in the low temperature state. That is, in the embodiment, the push-out gas is supplied into the plasma torch 16 while the modulated induction thermal plasma flame 100 is in the low temperature state and the supply of the Si powder is suspended.

The above cycle (the cycle shown in FIG. 6) is repeated during a production period of the Si nanoparticles. In each cycle, the Si powder is, together with the carrier gas, intermittently supplied to the modulated induction thermal plasma flame 100; specifically, the Si powder is supplied to the modulated induction thermal plasma flame 100 while the modulated induction thermal plasma flame 100 is in the high temperature state, whereas the supply of the Si powder is suspended while the modulated induction thermal plasma flame 100 is in the low temperature state.

The Si powder supplied into the modulated induction thermal plasma flame 100 is evaporated and becomes a mixture in a as phase state. Immediately after this, the mixture is rapidly cooled in the upstream chamber 18a and the downstream chamber 18b situated downstream therefrom, whereby the Si nanoparticles are produced. Whilst a part of the produced Si nanoparticles is collected in the upstream chamber 18a and the downstream chamber 18b, a most part thereof is sucked by the vacuum pump 20b and collected on the surface of the filter 20a of she collection section 20.

In the embodiment, as described above, the Si powder is supplied to the modulated induction thermal plasma flame 100 while the modulated induction thermal plasma flame 100 is in the high temperature state, whereas the supply of the Si powder is suspended while the modulated induction thermal plasma flame 100 is in the low temperature state. This makes it possible to efficiently produce the Si nanoparticles and increase the amount of production (yield) of the Si nanoparticles with respect to the coil supply power.

While the modulated induction thermal plasma flame 100 is in the low temperature state, the push-out gas is supplied into the plasma torch 16 to push out the mixture in a gas phase state that is present in the plasma torch 16, in a downward direction. Accordingly, it is possible to suppress the retention and upward movement of the mixture in a gas phase state that is present in the plasma torch 16. Further, since the push-out gas is supplied toward the lower end of the plasma torch 16, it is possible to promptly move the mixture in a gas phase state from the place where the thermal plasma flame is formed, i.e., the high temperature place, to the chamber 18. Since the mixture can be quickly (rapidly) cooled owing to this configuration, the crystallization rate of Si vapor is further increased, and hence, fine Si nanoparticles with a narrow particle size frequency distribution width can be obtained.

Figure 8:
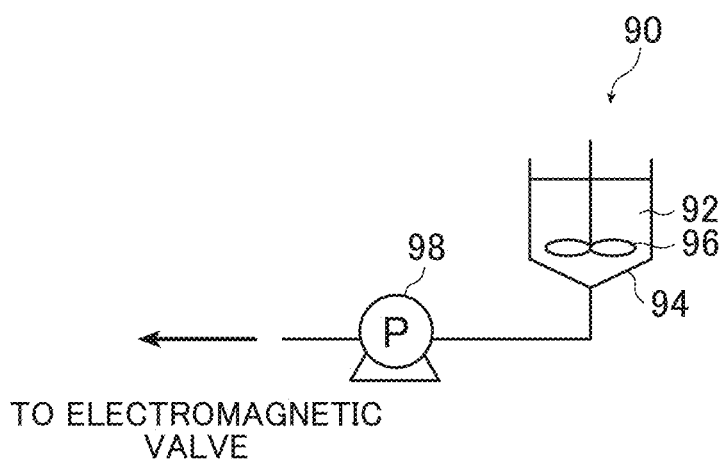
FIG. 8 is a schematic view showing another example of a feedstock supply section.

The fine particle production apparatus and the fine particle production method according to the invention have been described above; however, the foregoing embodiment is merely an example, and other embodiments are also applicable. For example, in the above embodiment, the Si powder is used as the feedstock for fine particle production, and the Si powder is dispersed using the carrier gas when supplied into the plasma torch 16. However, the invention is not limited thereto, and feedstock may be supplied in the form of slurry or colloidal liquid. Examples of the slurry or colloidal liquid include a mixture having Si powder dispersed in a dispersion medium or a turbid liquid having Si powder mixed therein. In such cases, a liquid feedstock supply device 90 shown in FIG. 8 is used in place of the feedstock supply mechanism 12. The liquid feedstock supply device 90 is connected to the inflow port Pg of the first valve 34a through a pipe or the like.

The liquid feedstock supply device 90 includes a vessel 94 storing a slurry 92 (colloidal liquid), an agitator 96 agitating the slurry 92 in she vessel 94, a pump 98 applying a high pressure to the slurry 92 (colloidal liquid) to supply the slurry, and an atomization gas supply source (not shown) used to convert the slurry 92 (colloidal liquid) into the form of droplets. The slurry 92 (colloidal liquid) converted into the form of droplets by use of pressure-fed atomization gas is supplied into the plasma torch 16 via the first valve 34a.

Aside from that, feedstock may be dissolved in a solvent to obtain a solution, and the feedstock in the form of a solution may be supplied to the thermal plasma flame. Also in this case, the liquid feedstock supply device 90 is used in the same manner as the case with the slurry or colloidal liquid described above. In this case, similarly, the feedstock in the form of a solution is converted into the form of droplets by use of atomization gas and then supplied into the plasma torch 16 via the first valve 34a.

The above embodiment is described assuming that the timing when the supply of the powder feedstock 44 stops is inevitably shifted with respect to the timing when the modulated induction thermal plasma flame 100 is modulated as shown in FIG. 6 due to, for instance, the influence of response speed of the first, valve 34a; however, the invention is not limited thereto. Even when those two timings are fully synchronized (totally the same), needless to say, the fine particle production apparatus and the fine particle production method described above are effective.

Whilst producing the Si nanoparticles from the Si powder is taken as an example in the embodiment, particles of another element may be used as feedstock for fine particle production to produce fine particles of an oxide, a metal, a nitride or a carbide of that element.

For instance, any type of feedstock may be used as long as it can be evaporated by the thermal plasma flame, and the following substances are preferred. That is, there may be appropriately selected one of a single element oxide, a complex oxide, a multiple oxide, an oxide solid solution, a metal, an alloy, a hydroxide, a carbonic acid compound, a halide, a sulfide, a nitride, a carbide, a hydride, a metal salt and a metal-organic compound each of which contains at least one selected from the group consisting of the elements with the atomic numbers 3 to 6, 11 to 15, 19 to 34, 37 to 52, 55 to 60, 62 to 79 and 81 to 83.

The single element oxide refers to an oxide formed from one element in addition to oxygen, the complex oxide refers to an oxide constituted of plural types of oxides, the multiple oxide refers to a higher order oxide formed from two or more types of oxides, and the oxide solid solution refers to a solid in which different oxides are dissolved and mixed with each other. The metal refers to one consisting of one or more metallic elements alone, and the alloy refers to one constituted of two or more metallic elements, with the alloy structure assuming the state of a solid solution, a eutectic mixture, an intermetallic compound, or a mixture thereof, in some cases.

The hydroxide refers to one constituted of a hydroxyl group and one or more metallic elements, the carbonic acid compound refers to one constituted of a carbonic acid group and one or more metallic elements, the halide refers to one constituted of a halogen and one or more metallic elements, and the sulfide refers to one constituted of sulfur and one or more metallic elements. The nitride refers to one constituted of nitrogen and one or more metallic elements, the carbide refers to one constituted of carbon and one or more metallic elements, and the hydride refers to one constituted of hydrogen and one or more metallic elements. The metal salt refers to an ionic compound containing one or more metallic elements, and the metal-organic compound refers to an organic compound having a bond between one or more metallic elements and at least one of elements C, O and N, as exemplified by a metal alkoxide and an organometallic complex.

Examples of the single element oxide include a titanium oxide ($TiO_2$), a zirconium oxide ($ZrO_2$), a calcium oxide (CaO), a silicon oxide ($SiO_2$), an aluminum oxide (alumina: $Al_2O_3$), a silver oxide ($Ag_2O$), an iron oxide, a magnesium oxide (MgO), a manganese oxide ($Mn_3O_4$), an yttrium oxide ($Y_2O_3$), a cerium oxide, a samarium oxide, a beryllium oxide (BeO), a vanadium oxide ($V_2O_5$), a chromium oxide ($Cr_2O_3$), and a barium oxide (BaO).

Examples of the complex oxide include a lithium aluminate ($LiAlO_2$), an yttrium vanadate, a calcium phosphate, a calcium zirconate ($CaZrO_3$), a titanium lead zirconate, a titanium iron oxide ($FeTiO_3$) and a titanium cobalt oxide ($CoTiO_3$). Examples of the multiple oxide include a barium stannate ($BaSnO_3$), a barium (meta)titanate ($BaTiO_3$), a lead titanate ($PbTiO_3$), and a solid solution in which a zirconium oxide and a calcium oxide form a solid solution in a barium titanate.

One usable example of the hydroxide is $Zr(OH)_4$, that of the carbonic acid compound is $CaCO_3$, that of the halide is $MgF_2$, that of the sulfide is ZnS, that of the nitride is TiN, that of the carbide is SiC, and that of the hydride is $TiH_2$.

EXAMPLE

Example of the fine particle production method of the invention is specifically described below.

In Example, the production apparatus 10 shown in FIG. 1 was used in production of fine particles.

In addition, a comparative experiment (Comparative Example) was carried out according to a fine particle production method different from the method of the invention.

A production apparatus used in Comparative Example was the same as the production apparatus 10 shown in FIG. 1 except that the push-out gas supply section 35 was not disposed.

Table 1 below shows experimental conditions common to Example and Comparative Example.

TABLE 1

| | Conditions |
|---|---|
| Input power | 20 kW |
| Sheath gas composition and flow rate | Ar: 90 L/min |
| | $H_2$: 1 L/min |
| Pressure in plasma torch | 300 Torr(≈40 kPa) |
| Carrier gas flow rate | Ar: 4 L/min |
| Conditions of coil current modulation | Cycle 15 ms |
| | Duty factor 80% |
| | Current modulation factor 80% |
| Feedstock supply method | Intermittent supply |
| Conditions of opening-closing of first valve | Cycle 15 ms |
| | Open time 8 ms |
| | Closed time 7 ms |
| Delay time of opening of first valve | 9 ms |

<Experimental Conditions>

The common experimental conditions are described. The average input for plasma generation was specified as being constant at 20 kw, and a mixture of Ar gas and hydrogen gas was used as the sheath gas with a flow rate of Ar gas of 90 L/min and a flow rate of hydrogen gas of 1 L/min (both of which are values obtained through conversion to values under the standard conditions; hereinafter the same). Ar gas as the sheath gas was supplied at 45 L/min in each of an axial direction and a swirl direction inside the torch, and hydrogen gas as the sheath gas was supplied only in the swirl direction.

The coil current was pulse-modulated, the modulation cycle was set to 15 ms, the percentage of the ON time in one cycle, i.e., the duty factor DF was set to 80%, and the amplitude ratio of the coil current, i.e., the current modulation factor SCL was set to 80%.

Ar gas was used as the carrier gas, and the flow rate thereof was set to 4 L/min. The pressure in the plasma torch was fixed to 300 Torr (≈40 kPa), and for the Si powder of the feedstock, Si powder (No. 360) manufactured by Yamaishi Metal Co., Ltd. was used and supplied by an intermittent supply method. A solenoid valve (MHE4-MS1H-3/2G-1-4K) manufactured by Festo Corporation was used as the first valve to switch between supply and non-supply of the feedstock, the valve opening-closing cycle was set to 15 ms, the valve open time was set to 8 ms, and the valve closed time was set to 7 ms. The term "valve open" for the first valve means that the supply path for the feedstock is opened or open in the first valve, and the term "valve closed" means that the supply path for the feedstock is closed.

The timing of the valve open in the first valve is delayed by 9 ms from the start time point of the ON time in the modulation cycle of the coil current.

Light emitted from a modulated induction thermal plasma flame was shot with a high speed video camera (MEMRE-CAM HX-5) manufactured by nac Image Technology Inc. with a frame rate of 1000 fps and 8-bit resolution. Further, the light thus shot was subjected to a spectroscopic analysis. Specifically, the radiant intensities of light with wavelengths derived from gases for plasma generation and the feedstock, more specifically, light derived from ArI (wavelength: 811.53 mm), light derived from Hα (wavelength: 656.28 nm), light derived from SiI (wavelength: 390.55 nm), and light derived from SiH (wavelength: 395.63 nm) were measured.

Differences in experimental condition between Example and Comparative Example are shown in Table 2 below.

TABLE 2

| | Example | Comparative example |
|---|---|---|
| Supply of push-out gas | Supplied | Not supplied |
| Push-out gas flow rate | Ar: 4 L/min | — |
| Conditions of opening-closing of second valve | Cycle 15 ms | — |
| | Open time 3 ms | |
| | Closed time 12 ms | |
| Delay time of opening of second valve | 8 ms | — |

The push-out gas was supplied while the modulated induction thermal plasma flame was in the low temperature state in Example, whilst the push-out gas was not supplied in Comparative Example. In Example, Ar gas was used as the push-out gas, and the flow rate thereof was set to 4 L/min. A solenoid valve (MHE2-MS1H-3/2G-M7-K) manufactured by Festo Corporation was used as the second valve to switch between supply and non-supply (more precisely, supply of the push-out gas to the position immediately anterior to the first valve) of the push-out gas, the valve opening-closing cycle was set to 15 ms, the valve open time was set to 3 ms, and the valve closed time was set to 12 ms. The term "valve open" for the second valve means that the path allowing the push-out gas to flow to the first valve is opened or open in the second valve, and the term "valve closed" means that the path allowing the push-out gas to flow to the first valve is closed.

The timing of the valve open in the second valve is delayed by 8 ms from the start time point of the ON time in the modulation cycle of the coil current.

In Example, the particle size frequency distribution and the average particle size of produced fine particles were checked with an SEM (scanning electron microscope).

<Measurement Results of Radiant Intensities>

In Comparative Example, when the modulated induction thermal plasma flame was in the low temperature state, the radiant intensities of light derived from the feedstock (specifically, light derived from SiI and light derived from SiH) were observed to be relatively high in the upper portion of the plasma torch. This is probably because a mixture in a gas phase state obtained by evaporation of the Si powder remains or moves upward inside the plasma torch when the modulated induction thermal plasma flame is in the low temperature state. In Comparative Example, cooling of the mixture was slightly slow due to this phenomenon, and because of this, the particle size and surface area of produced Si nanoparticles were relatively large.

In contrast, in Example, the radiant intensities of light derived from the feedstock were not observed to be high in the upper portion of the plasma torch when the modulated induction thermal plasma flame was in the low temperature state. This is probably because, in Example, introduction of the push-out gas into the plasma torch while the modulated induction thermal plasma flame was in the low temperature state acted to suppress the retention and upward movement of the mixture in a gas phase state inside the plasma torch.

<SEM Observation Results>

Experiments of production of Si nanoparticles were carried out under the respective experimental conditions for Example and Comparative Example, and then the resultant nanoparticles were collected with the chamber and the filter of the collection section. For the filter, a bag filter (Microtechs MT-1000) manufactured by Japan Filter Technology, Ltd. was used.

The amount of collected Si nanoparticles and the rate of the amount of collection to the amount of supply were both larger and higher in Example than Comparative Example. This is probably because, in Example, the upward movement of the mixture in a gas phase was suppressed due to introduction of the push-out gas whereby the retention time of Si nanoparticles inside the plasma torch was decreased, resulting in a decrease in particle attachment to the inside of the plasma torch.

Figure 9A:
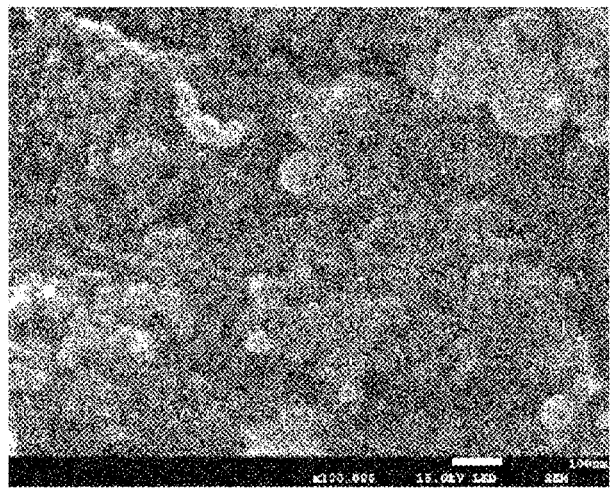
FIG. 9A is a diagram (a photograph as a substitution) showing an SEM image of fine particles collected in an upstream chamber in Example.
Figure 9B:
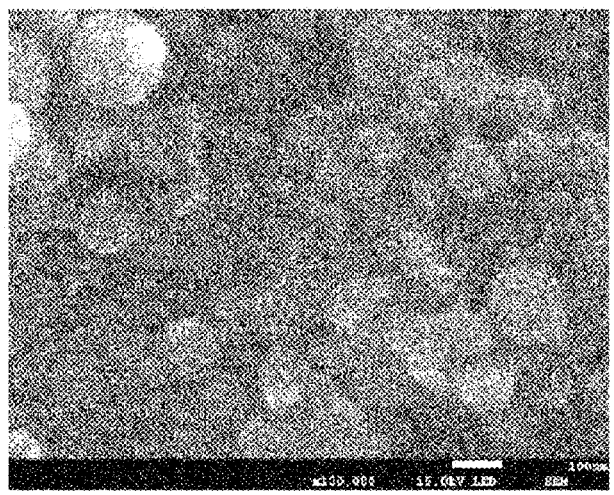
FIG. 9B is a diagram (a photograph as a substitution) showing an SEM image of fine particles collected in a downstream chamber in Example.
Figure 9C:
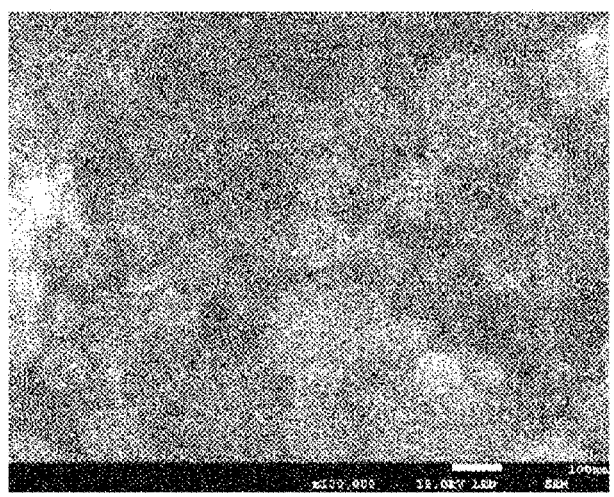
FIG. 9C is a diagram (a photograph as a substitution) showing an SEM image of fine particles collected on a filter in Example.

SEM images of Si nanoparticles collected in Example are shown in FIGS. 9A to 9C. FIG. 9A shows Si nanoparticles collected in the upstream chamber, FIG. 9B shows Si nanoparticles collected in the downstream chamber, and FIG. 9C shows Si nanoparticles collected on the filter.

It can be seen from FIGS. 9A to 9C that, in Example, a large number of Si nanoparticles with an extremely small particle size were produced. This is probably because, in Example, introduction of the push-out gas acted to suppress the retention of the mixture in a gas phase state while the modulated induction thermal plasma flame was in the low temperature state, and this made it possible to efficiently (rapidly) cool the mixture.

<Particle Size Frequency Distribution/Average Particle Size>

Figure 10A:
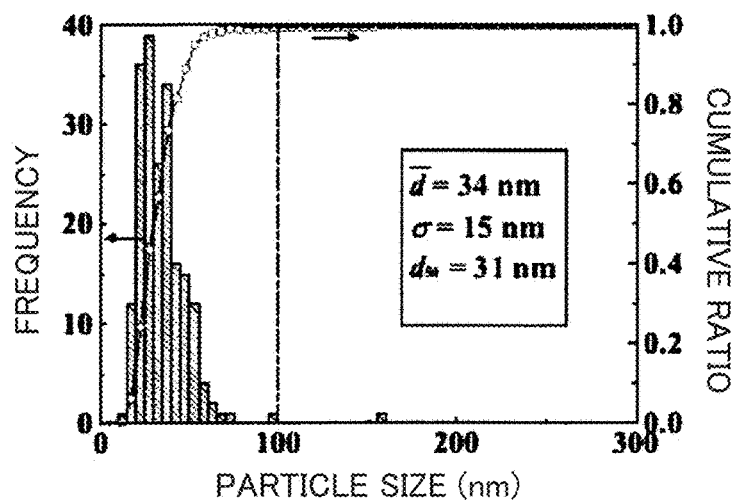
FIG. 10A is a diagram showing a particle size frequency distribution of fine particles collected in the upstream chamber in Example.
Figure 10B:
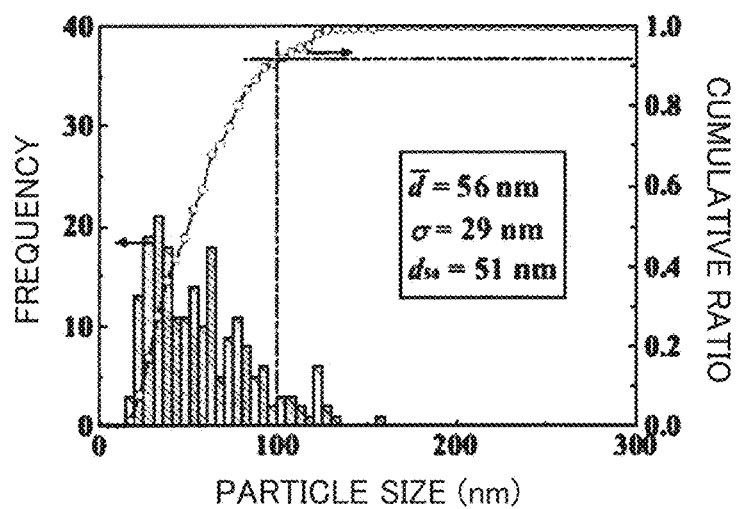
FIG. 10B is a diagram showing a particle size frequency distribution of fine particles collected in the downstream chamber in Example.
Figure 10C:
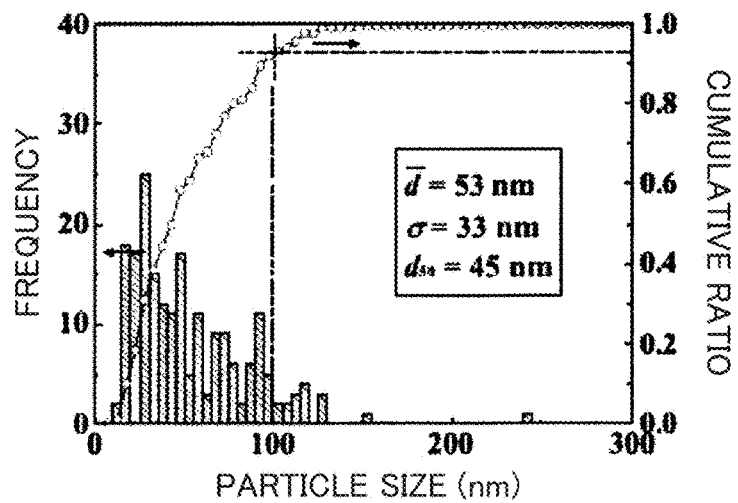
FIG. 10C is a diagram showing a particle size frequency distribution of fine particles collected on the filter in Example.

In Example, 200 particles were randomly picked up using each of the SEMI images of Si nanoparticls obtained separately in the upstream chamber and the downstream chamber and on the filter, and the particle size frequency distributions were examined. The results thereof are shown in FIGS. 10A to 10C. FIG. 10A shows the particle size frequency distribution of Si nanoparticles collected in the upstream chamber, FIG. 10B shows the particle size frequency distribution of Si nanoparticles collected in the downstream chamber, and FIG. 10C shows the particle size frequency distribution of Si nanoparticles collected on the filter. FIGS. 10A to 10C each show the particle size frequency and the cumulative ratio of the particle size, as well as values of the average particle size, the standard deviation of the particle size, and the median diameter.

It can be seen from FIGS. 10A to 10C that, in Example, the width of each particle size frequency distribution of Si nanoparticles remarkably narrow. This is probably because, in Example, owing to introduction of the push-out gas, the mixture in a gas phase state was pushed out downward while the modulated induction thermal plasma flame was in the low temperature state, and this made it possible to efficiently (rapidly) cool the mixture.

From the foregoing, the effects of the invention are apparent.

REFERENCE SIGNS LIST

10 production apparatus
12 feedstock supply mechanism
14 high frequency modulated induction thermal plasma generation section
15 carrier gas supply source
16 plasma torch
16a, 16e quartz tube
16b high frequency oscillation coil
16c probe insertion port
16d sheath gas supply port
16f cooling water
18 chamber
18a upstream chamber
18b downstream chamber
20 collection section
20a filter
22 intermittent supply section
22a trigger circuit
24 water-cooled probe
26a high frequency inverter power source
26b impedance matching circuit
26c pulse signal generator
26d FET gate signal circuit
28 plasma spectroscopic analysis section
28a optical system
28b spectrometer
28c PMT
29a lens
29b light guiding part
30 DSP
32 gas introduction section
34a first valve
34b second valve
35 push-out gas supply section
35a trigger circuit
35b purge line
35c push-out gas supply source
42 storage tank
44 powder feedstock
46 agitator shaft
48 agitator blade
50a, 50b oil seal
52a, 52b bearing
54a, 54b motor
60 screw feeder
62 screw
64 shaft
66 casing
70 dispersion section
72 outer tube
74 powder dispersion chamber
76 rotating brush
78 gas supply port
80 gas passage
82 transport pipe
90 liquid feedstock supply device
92 slurry
94 vessel
96 agitator
98 pump
100 modulated induction thermal plasma flame
102 square wave
Pg, Ph, Pm inflow port
Pi, Pa, Po outflow port

The invention claimed is:

1. An apparatus for producing fine particles, the apparatus comprising:
a feedstock supply section configured to intermittently supply feedstock for fine particle production into a thermal plasma flame;
a plasma torch in which the thermal plasma flame is generated, the plasma torch being configured to evaporate, by use of the thermal plasma flame, the feedstock supplied by the feedstock supply section and thereby convert the feedstock to a mixture in a gas phase state;
a plasma generation section configured to generate the thermal plasma flame inside the plasma torch;
a gas supply section configured to supply gas into the plasma torch; and
a control section configured to control the feedstock supply section and the gas supply section wherein the plasma generation section generates, as the thermal plasma flame, a modulated induction thermal plasma flame whose temperature state is time-modulated, and periodically switches the modulated induction thermal plasma flame between a high temperature state and a low temperature state having a lower temperature than the high temperature state, wherein the control section controls the feedstock supply section such that the feedstock is, together with carrier gas, supplied into the plasma torch by the feedstock supply section while the modulated induction thermal plasma flame is in the high temperature state, and wherein the control section controls the feedstock supply section such that supply of the feedstock is suspended and controls the gas supply section such that the gas is supplied into the plasma torch to push the mixture in the gas phase state out of a place where the modulated induction thermal plasma flame is formed in the plasma torch while the modulated induction thermal plasma flame is in the low temperature state.

2. The apparatus for producing fine particles according to claim 1, including:
a spectroscopic analysis section configured to conduct a spectroscopic analysis on light emitted from the modulated induction thermal plasma flame,
wherein the control section controls the feedstock supply section based on a result of the spectroscopic analysis by the spectroscopic analysis section such that the feedstock is supplied to the modulated induction thermal plasma flame while the modulated induction thermal plasma flame is in the high temperature state and that the supply of the feedstock is suspended while the modulated induction thermal plasma flame is in the low temperature state.

3. The apparatus for producing fine particles according to claim 2, wherein the control section controls the gas supply section based on a result of the spectroscopic analysis such that the gas is supplied while the modulated induction thermal plasma flame is in the low temperature state.

4. The apparatus for producing fine particles according to claim 1, wherein the feedstock supply section intermittently supplies the feedstock into the modulated induction thermal plasma flame with the feedstock being dispersed in a particulate form.

5. The apparatus for producing fine particles according to claim 1, including a chamber connected to a lower end part of the plasma torch, the chamber being configured to cool the mixture to generate the fine particles and to collect the fine particles,
wherein the gas supply section supplies the gas such that the gas flows toward a lower end of the plasma torch inside the plasma torch.

6. The apparatus for producing fine particles according to claim 2, wherein the feedstock supply section intermittently supplies the feedstock into the modulated induction thermal plasma flame with the feedstock being dispersed in a particulate form.

7. The apparatus for producing fine particles according to claim 3, wherein the feedstock supply section intermittently supplies the feedstock into the modulated induction thermal plasma flame with the feedstock being dispersed in a particulate form.

8. The apparatus for producing fine particles according to claim 2, including a chamber connected to a lower end part of the plasma torch, the chamber being configured to cool the mixture to generate the fine particles and to collect the fine particles,
wherein the gas supply section supplies the gas such that the gas flows toward a lower end of the plasma torch inside the plasma torch.

9. The apparatus for producing fine particles according to claim 3, including a chamber connected to a lower end part of the plasma torch, the chamber being configured to cool the mixture to generate the fine particles and to collect the fine particles,
wherein the gas supply section supplies the gas such that the gas flows toward a lower end of the plasma torch inside the plasma torch.

10. The apparatus for producing fine particles according to claim 4, including a chamber connected to a lower end part of the plasma torch, the chamber being configured to cool the mixture to generate the fine particles and to collect the fine particles,
wherein the gas supply section supplies the gas such that the gas flows toward a lower end of the plasma torch inside the plasma torch.

11. The apparatus for producing fine particles according to claim 6, including a chamber connected to a lower end part of the plasma torch, the chamber being configured to cool the mixture to generate the fine particles and to collect the fine particles,
wherein the gas supply section supplies the gas such that the gas flows toward a lower end of the plasma torch inside the plasma torch.

12. The apparatus for producing fine particles according to claim 7, including a chamber connected to a lower end part of the plasma torch, the chamber being configured to cool the mixture to generate the fine particles and to collect the fine particles,
wherein the gas supply section supplies the gas such that the gas flows toward a lower end of the plasma torch inside the plasma torch.

* * * * *